P. HILSINGER.
SAW SHARPENER.
APPLICATION FILED MAR. 18, 1913.
1,095,865.
Patented May 5, 1914.
2 SHEETS—SHEET 1.
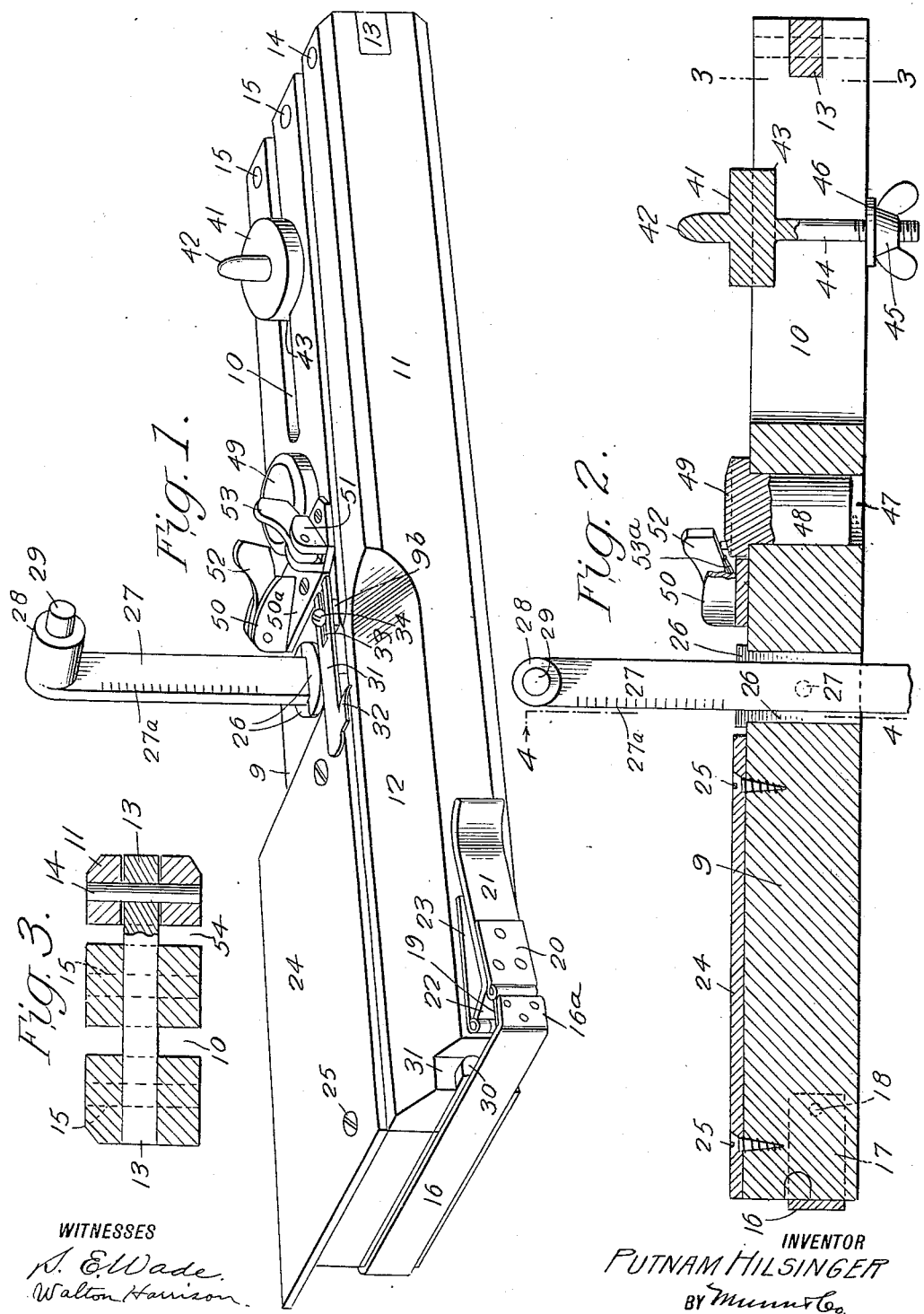
WITNESSES
N. E. Wade
Walton Harrison
INVENTOR
PUTNAM HILSINGER
BY Munn & Co.
ATTORNEYS

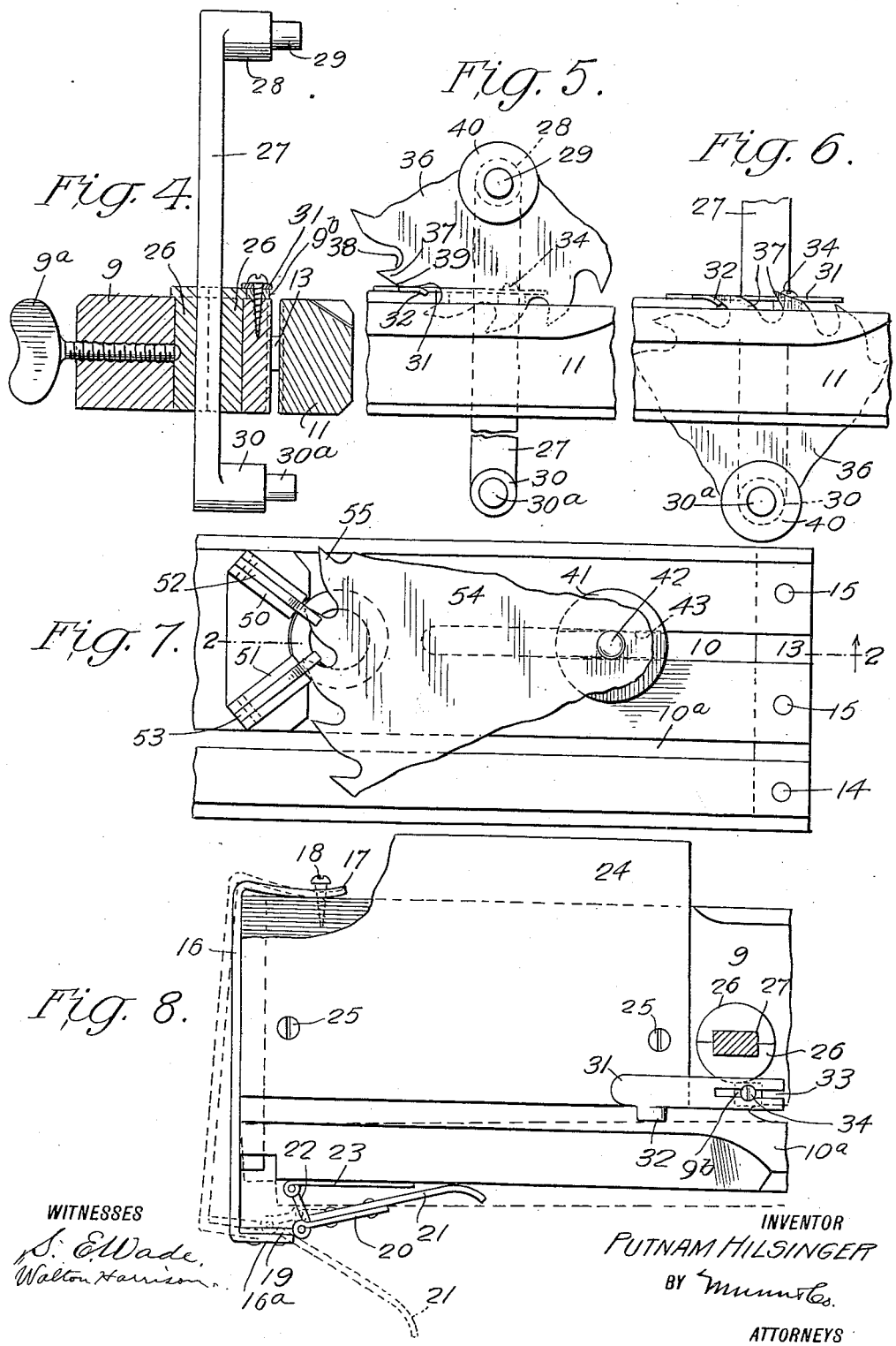

UNITED STATES PATENT OFFICE.

PUTNAM HILSINGER, OF KILLAWOG, NEW YORK.

SAW-SHARPENER.

1,095,865.  Specification of Letters Patent.  Patented May 5, 1914.

Application filed March 18, 1913. Serial No. 755,091.

*To all whom it may concern:*

Be it known that I, PUTNAM HILSINGER, a citizen of the United States of America, and a resident of Killawog, in the county of Broome and State of New York, have made certain new and useful Improvements in Saw-Sharpeners, of which the following is a specification.

My invention relates to saw sharpeners, my more particular purpose being to provide an improved device of this kind in which the handling of the saw is greatly facilitated, and in which the placing of the saw teeth, for the purpose of operating upon the same, is rendered specially accurate.

My invention further comprehends various improvements in the construction of saw sharpeners for the purpose of increasing the efficiency thereof without unduly complicating the mechanism employed.

Reference is made to the accompanying drawings forming a part of this specification, and in which like letters indicate like parts.

Figure 1 is a perspective showing my device completed. Fig. 2 is a longitudinal section through the same upon the line 2—2 of Fig. 7, looking in the direction of the arrow. Fig. 3 is a cross section on the line 3—3 of Fig. 2 looking in the direction of the arrow. Fig. 4 is a cross section on the line 4—4 of Fig. 2 looking in the direction of the arrow. Fig. 5 is a detail showing in elevation how the teeth of the saw are brought into predetermined positions in order to be sharpened upon their front or cutting edges. Fig. 6 is a detail showing in fragmentary perspective how the teeth are brought into position to enable them to be filed upon their outer surfaces, so as to form the points upon them. Fig. 7 is a fragmentary plan showing how the setting mechanism is used. Fig. 8 is a view partly in plan and partly in section, showing the clamping mechanism for holding the saw in order to sharpen the latter.

A massive board 9 is provided with a slot 10 and forms practically the framework of the device. A clamping bar 11 having the same thickness as the board 9 is provided with a bevel 12 and is movable relatively to the board 9. A bar 13 is mortised into one end of the board 9 and the adjacent end of the bar 11. A bolt 14 extends through the bar 11 and adjacent portion of the bar 13, the bolt 14 thus constituting a pin upon which the bar 11 is journaled and adapted to swing. The bar 11 and the board 9 are together cut away so as to form a slot $10^a$, so that when the bar 11 is forced against the saw, as hereinafter described, the portion of the saw within the slot $10^a$ is not gripped. Bolts 15 extend through the bar 13 and adjacent portions of the board 9 so as to hold the bar 13 fixedly in relation to the board 9.

A strip 16 of spring metal is provided with a portion 17, this portion being bent to an angle with the adjacent portion of the strip 16, and also slightly curved as indicated in Fig. 8. A fastening 18 which in this instance is a screw, secures the portion 17 to the board 9. The strip 16 normally tends to stand slightly away from the adjacent end of the board 9, as indicated by dotted lines in Fig. 8. The strip 16 is provided with a bent portion $16^a$. Secured to the latter is a hinge member 19. Another hinge member is shown at 20, these two hinge members being connected and together constituting a hinge. Secured rigidly to the hinge member 20 is a hand lever 21, the latter being provided with a bent portion 22, which is hinged to a plate 23, this plate being secured rigidly to the adjacent edge of the bar 11. Whenever the hand lever 21 is turned slightly in a clockwise direction according to Fig. 8, as indicated by dotted lines in said figure, the strip 16 is at first pulled endwise by virtue of the toggle like action of the portion 22 of the hand lever, and then the portion 16, because of its tendency to resume its normal position indicated by dotted lines in Fig. 8, moves the hand lever 21 still farther in the same direction of rotation. In other words, after the hand lever 21 is rocked a certain distance away from the bar 11, the hand lever springs into the position indicated by dotted lines in Fig. 8. When however, the hand lever is pressed back toward the bar 11 so as to approach the bar 11, the hand lever suddenly springs against the bar. The tension of the strip 16 therefore, has a tendency to press the bar 11 against the plate 9 or hold the bar 11 away from the plate 9, according to the position of the hand lever 21.

A plate 24 is secured upon the board 9 by aid of screws 25. Two bearing members 26, each being substantially semi-cylindrical in general outline, extend through the board 9 and between these bearing members is located a post 27, the inner surfaces of the bearing members having suitable conformity to fit the surface of said post, which in this instance is rectangular in cross section. The post 27 is provided with graduations 27$^a$, these graduations being employed for facilitating the adjustment of the post for saws of different diameters. The upper end of the post 27 is provided with a head 28 and extending from this head is a pin 29 upon which the saw may be fitted, as indicated in Fig. 5.

The post 27 at its lower end is provided with a head 30, and extending from the latter is a pin 30$^a$. A saw may be mounted upon this pin if the post 27 be lowered sufficiently for the purpose, as indicated in Fig. 6. A set screw 9$^a$ extends through a portion of the board 9 and into engagement with one of the bearing members 26.

In order to adjust the post 27, the screw 9$^a$ is loosened, the post is raised or lowered as desired (the graduations 27$^a$ being employed to facilitate this object if desired) and the screw 9$^a$ is then tightened to hold the post 27 securely in position.

Mounted upon the board 9 and spaced slightly above the same by a spacing washer 9$^b$, is a filing plate 31, made of metal and provided with a tongue 32 integral with the plate and bent slightly downward from its general plane, as indicated in Fig. 1.

The plate 31 is provided with a slot 33, through which extends a screw 34, the latter also extending through the spacing washer 9$^b$ and into the adjacent surface of the board 9. The plate 31 may be swung slightly upon the screw 34 as a center, so that the tongue 32 rests upon the upper surface of the plate 24. The plate 31 may also occupy the position indicated in Fig. 1, one edge of the tongue 32 being lodged against the adjacent edge of the plate 24.

A circular saw to be sharpened is shown at 36 and is provided with teeth 37, each tooth having a front or cutting edge 38 and an outer idle edge 39. Both of these edges must be operated upon in order to properly sharpen the tooth.

A collar 40 is fitted upon the pin 29 or 30$^a$, as the case may be, for the purpose of securing and retaining the saw upon the pin upon which it is mounted.

The operation of the saw sharpening mechanism is as follows:—The post 27 is adjusted as above described relatively to the board 9, so that the pin 29 will be at a suitable elevation above the board commensurate with the radius of the saw, which of course varies. This being done, the plate 31 is adjusted so that when one of the saw teeth rests upon the tongue 32, as indicated in Fig. 5, this tooth is in suitable position for a file to be applied to it in order to sharpen it by hand. The hand lever 21 is now forced toward the bar 11 and this bar is thus clamped tightly against the saw, which rests against the adjacent portion of the board 9. After the tooth resting upon the tongue 32 is sharpened, the hand lever 21 is swung outwardly away from the bar 11—that is, turned in a clockwise direction according to Fig. 8—so that the saw is no longer held by the bar 11. The saw is now turned by hand upon the pin 29 as a center, so that the next successive tooth 37 is brought into position. To facilitate the accomplishment of this purpose the plate 31 is swung upon the screw 34 as a center so that the tongue 32 rests upon the plate 24 and is, for the moment, out of the way. The plate 31 being replaced so that the tongue 32 engages the under side of the next tooth to be sharpened, as indicated in Fig. 5, the file is applied by hand to the tooth in question. The process is continued until each tooth in the saw has been treated as described; that is, sharpened upon its forward or cutting edge. The lever 21 being swung outwardly or away from the bar 11, the saw is removed from the pin 29 and placed upon the pin 30$^a$. The plate 31 is now swung, upon the screw 34, as a center, into such position that the tongue 32 rests against the adjacent edge of the plate 24. The wing bolt 9$^a$ is now loosened, and the post 27 is lowered so that the uppermost tooth carried by the saw extends about a quarter of an inch above the upper surface of the plate 31. The screw 9$^a$ is then tightened so as to clamp the post 27 rigidly in position. The plate 31 is next moved in the general direction of its length so as to engage the tooth immediately adjacent to it, the top of this tooth being brought up flush with the top of the plate 31, as indicated in Fig. 6. The screw 34 is now tightened and the tooth engaging the tongue 32 is dressed upon its outer edge.

I will now describe the saw setting mechanism, which is shown more particularly in Figs. 1, 7 and 8. A head 41 having generally the form of a disk, is provided with a boss 42 extending upwardly from it, and is further provided with a rib 43 which fits neatly within the slot 10. The head 41 is also provided with a bolt 44 integral with it and extending downwardly through the slot 10, as indicated more particularly in Fig. 2. A wing nut 45 is fitted upon the lower portion of the bolt 44, which is threaded for this purpose. A washer 46 is disposed between the wing nut 45 and the adjacent portion of the board 9. By loosening the wing nut 45, the bolt 44 and head 41 may be moved bodily along the slot 10, and thus adjusted, after which the wing nut 45 may be tightened so as to render the head 41 rigid relatively to the board. The board 9 is provided with a hole 47, and fitted into the latter is a solid cylindrical block 48 provided at its upper end with a hard disk-like portion 49 constituting an anvil.

Two brackets 50, 51, are integrally mounted upon a single base 50ª, these parts preferably being cast. Two setting tools 52, 53, are pivotally mounted within the brackets 50, 51, and are adapted to extend radially toward the center of the anvil 49. Beneath each setting tool 52, 53 is a leaf spring 53ª which tends to keep the setting tool raised slightly above the surface of the anvil. When either setting tool is struck by a hammer, it is driven downwardly toward or against the anvil 49, after which it resumes its normal position, due to action of the spring beneath it. A saw to be set is shown at 54 and is provided with teeth 55.

The saw 54 is fitted upon the boss 42 as a center, and the head 41 is adjusted, as above described, so that the teeth of the saw rest upon the anvil 49. As the teeth of the saw are inclined to two different angles—that is to say, as some of the teeth are right handed and others are left handed—one of the setting tools 52, 53 is employed for setting half of the teeth, and the other used for setting the other half of the teeth. In practice, therefore, I throw one of the setting tools 52, 53 backwardly and out of the way until the other setting tool is used upon one-half of the teeth. I then take the saw off of the boss 42, turn it over, and place it back upon the boss 42, after which I turn it tooth by tooth, setting the various teeth by aid of the setting tool which was not used in connection with the saw before it was turned over.

For the work of setting, I simply strike the setting tool 52 or 53, with a hammer one time for each tooth. If desired, however, the setting tool may be struck more than once.

I do not limit myself to the precise construction shown, the scope of my invention being commensurate with my claims.

I claim:—

1. A saw sharpener comprising a frame, a bar journaled to said frame and adapted to swing relatively thereto in the same plane therewith, a clamping mechanism connected to said frame and to one end of the bar for forcing said bar toward said frame in order to clamp a saw against the same, and means for supporting the saw in position to be clamped against said frame.

2. In a saw sharpener, the combination of a board provided with a hole, a bearing located within said hole, said bearing comprising a pair of oppositely disposed separate pieces having their opposing edges recessed, a post extending between the bearing pieces and in the recesses, and a set screw extending through a portion of said board and engaging one of said pieces for the purpose of clamping said pieces together on both sides of the post, means for revolubly supporting a saw upon said post, and mechanism coacting with said board for clamping said saw.

3. A device of the class described comprising a board, a saw supporting post adjustably mounted relative to the board, and a filing plate adjustably mounted relative to the post and board, said plate having a saw tooth engaging and limiting portion.

4. A saw sharpener comprising a board, a post supported thereby and movable relatively thereto, said post carrying at its opposite ends means for engaging a saw, a bar located adjacent said board and adapted to press said saw against the edge of said board, and clamping mechanism connected with said board and with said bar for forcing said bar toward said board.

5. A saw sharpener comprising a frame, a post mounted upon said frame and adjustable relatively thereto, said post extending above and below said frame and being provided with a plurality of supporting members each adapted for holding a saw, clamping mechanism connected with said board and co-acting therewith for securing a saw rigidly in engagement with said board, and a filing plate mounted upon said board.

6. A saw sharpener comprising a board, a post adjustable relatively thereto and provided with means for engaging a saw at a point adjacent the middle of said board, a bar movable relatively to said board, means for forcing said bar toward said board in order to clamp said saw rigidly in relation to said board, a filing plate mounted upon said board and provided with a portion against which a saw tooth may be placed, and means for adjusting the position of said filing plate relatively to said board.

7. A device of the class described comprising a board, a post adjustable with relation thereto, and a filing plate adjustable with relation to the board and in a plane parallel with the adjusting plane of the post.

PUTNAM HILSINGER.

Witnesses:
M. E. MEAD,
N. J. BRIGHAM.